April 29, 1941.   J. VOLLMER   2,240,084
DRIVE FOR MOTOR VEHICLES
Filed Dec. 13, 1937   2 Sheets-Sheet 1
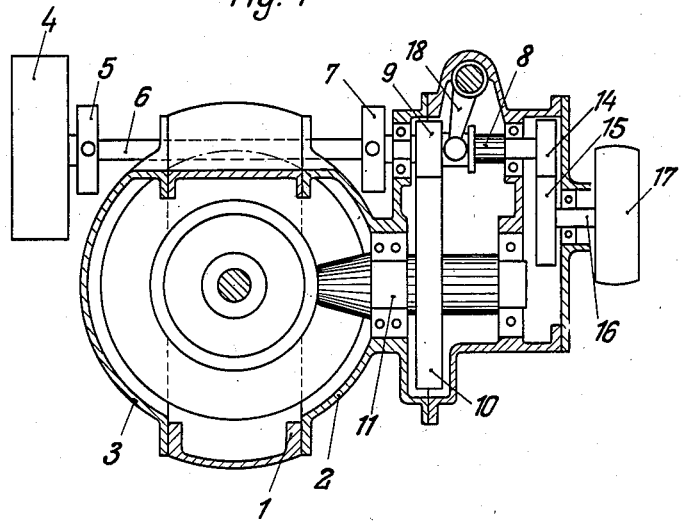
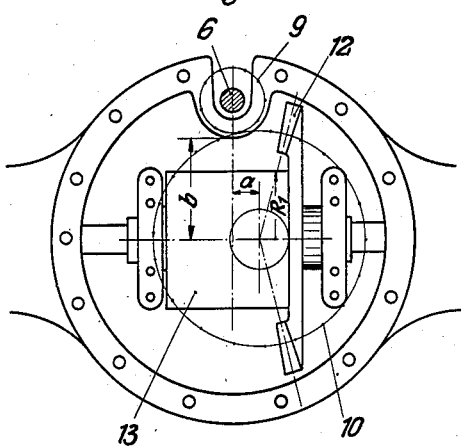
Inventor:
Joseph Vollmer

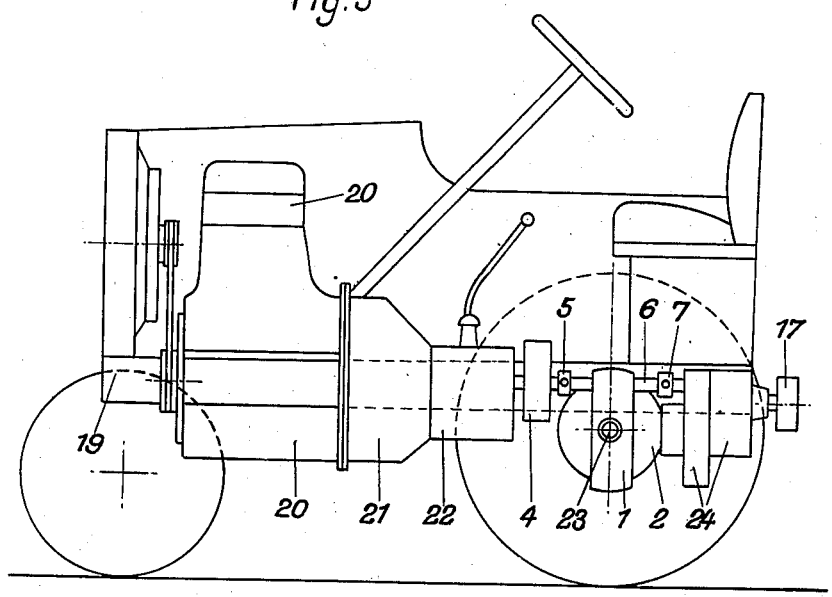

Patented Apr. 29, 1941

2,240,084

UNITED STATES PATENT OFFICE 2,240,084

DRIVE FOR MOTOR VEHICLES

Joseph Vollmer, Berlin-Schlachtensee, Germany, assignor to Motoren-Werke Mannheim Aktien-Gesellschaft, vormals Benz Abteilung Stationarer Motorenbau, Mannheim, Germany, a corporation of Germany Application December 13, 1937, Serial No. 179,578
In Germany January 7, 1937

1 Claim. (Cl. 74—11)

This invention relates to a drive for motor vehicles including tractors, which is combined with an intermediate gear and an auxiliary drive for driving additional devices.

One of the main objects of the invention is to insure good distribution of load on the front and rear axles and a short wheel base. In the known types of automotive vehicles equipped with Cardan shaft drive a short wheel base can be attained within certain limits. For this reason, in short-built tractors the engine, the gear box and the driving shaft are frequently combined into a single block, though this construction involves of course the sacrifice of the advantages afforded by light and separate units and necessitates the insertion and removal of the units forming the block, which is quite bothersome. Furthermore, in vehicles of this class the expenditure of material is greater and the distribution of load cannot be improved, even if this should be required later on at a variation in tractive force. The extent of utilizing load for the useful pulling force acting on the hook of a tractor depends, however, upon displacing if possible the entire weight of the tractor at maximum tractive power as friction load upon and to the driving wheels.

According to the invention, in vehicles equipped with Cardan shaft drive and separate units good distribution of load and a short wheel base are attained by arranging the intermediate gear of the driving axle in the rear of the center thereof where the joint connected with the axle is also disposed. The greater length of the propeller shaft resulting from this arrangement makes it possible to move the gear box up to the free front side of the bridge of the driving axle.

The arrangement further permits to derive the auxiliary drive required for tractors directly from the intermediate gear of the driving axle instead of from the gear box as usual.

By way of example, the invention is illustrated in the accompanying drawings, in which: Figure 1 is a cross section of the driving shaft provided with intermediate gear and auxiliary drive; Fig. 2, a longitudinal view of the central portion of the driving shaft; and Fig. 3 a diagrammatic side view of a tractor according to the invention.

Referring to the drawings, the casing 2 for the intermediate gear of the driving shaft is firmly connected with the bridge 1 which is shut off at the front side by the cover 3. The brake disc 4 of the gear box is disposed near the cover 3.

The driving power of the engine is transmitted to the driving shaft 8 for the intermediate gear by the joint 5, the articulated shaft 6 and the joint 7. The shiftable spur gear 9 transmits the torque to the spur gear 10 which is firmly connected with the pinion shaft 11 which then transmits the drive by means of a bevel gear toothing to the bevel wheel 12 firmly united with the differential casing 13.

Transmission of motion to the auxiliary drive is effected from the shaft 8 to the shaft 16 by means of the spur gears 14, 15. The shaft 16 is connected with a pulley 17 for stationary drive. By operation of the lever 18 the shaft 16 can be driven while the vehicle is moving or standing still. The auxiliary drive can be used for operating working implements, rope winches, etc.

In order to reduce the spacing of the intermediate shafts 8, 11 and thus the ground clearance of the vehicle to a minimum the articulated shaft 6 passes through the outline of the recessed bridge 1 while play is allowed for the oscillation of the shaft 6 in case of a cushioned chassis. As shown in Fig. 2, the center of the pinion shaft 11 is arranged at the distance $a$ from the center of the articulated shaft 6, so that the latter can be disposed laterally of the wheel 12 and the distance $b$ of the packing surface of the driving shaft can be reduced to the outer radius $R_1$ of the differential casing 13.

Fig. 3 shows the new gear applied to a tractor. 19 is the chassis, 20 the driving engine, 21 the casing surrounding the flywheel and the coupling, 22 the change speed gear, 23 the driving shaft and 24 the intermediate gear.

I claim:

A drive for tractors or like motor vehicles having a short wheel base, including a motor, a differential housing arranged in rear of the motor, a differential in the housing, wheel axis driven by the differential, a driving shaft driven by the motor, a recess in the differential housing through which the drive shaft extends and in which it is permitted a limited play in all directions, universal joints on the drive shaft in advance of and in rear of the recess in the housing, a secondary housing connected directly to and extending in rear of the first mentioned housing, the drive shaft in rear of the rearmost universal extending into the secondary housing, a slide movable longitudinally on and splined to the drive shaft, means for manually operating the slide, a pinion carried by the slide, an auxiliary drive shaft operating in both housings, a gear fixed on the auxiliary drive shaft in position to be engaged and operated by the pinion when the slide is in one position and to be free of such engagement in operation when the slide is in another position, a bevel ring gear mounted on and for operating the differential, a bevel gear on the auxiliary drive shaft engaging with and operating the bevel ring gear, a power take-off shaft supported by the secondary housing, and a continuous drive gear connection between the power shaft and the power take-off shaft.

JOSEPH VOLLMER.